Feb. 3, 1925.                                                    1,524,825
                         H. L. HUBBARD
                          VALVE LIFTER
                        Filed April 11, 1923
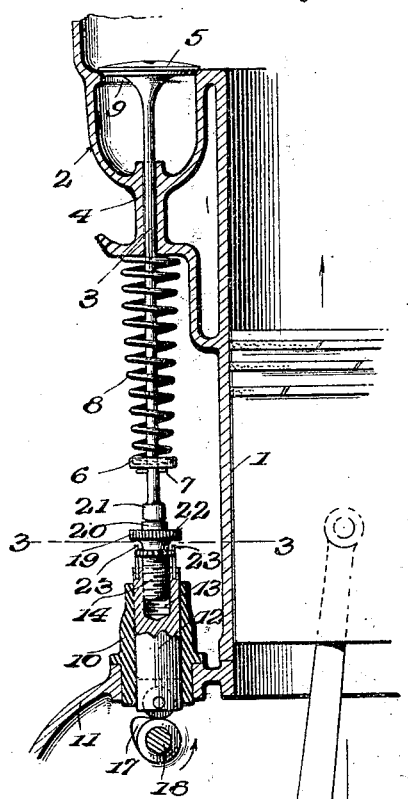
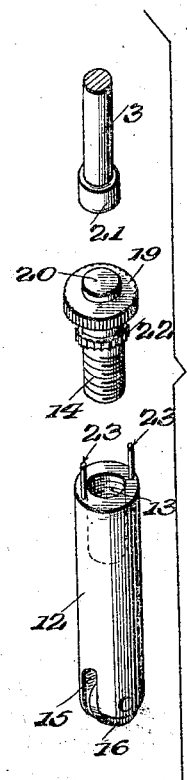
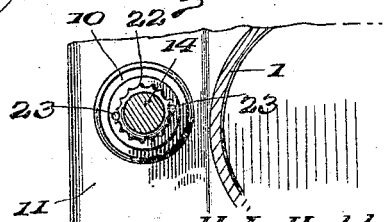
WITNESSES                                                        INVENTOR
W. A. Williams                                                 H. L. Hubbard,
                                                           BY
                                                                ATTORNEYS Patented Feb. 3, 1925.

1,524,825

UNITED STATES PATENT OFFICE.

HENRY LEWIS HUBBARD, OF CLEVELAND, OHIO.

VALVE LIFTER.

Application filed April 11, 1923. Serial No. 631,465.

*To all whom it may concern:*

Be it known that I, HENRY LEWIS HUBBARD, a citizen of the United States, and a resident of Cleveland, in the county of Cuyahoga and State of Ohio, have invented certain new and useful Improvements in Valve Lifters, of which the following is a specification.

This invention relates to adjusting mechanisms for poppet valves of internal combustion engines and has for its object the provision of a device to be employed in connection with push rods whereby said rods may be accurately adjusted to properly seat a valve and to prevent rattling of said valve and its parts when the same has become worn.

Another object of the invention is the provision of a device adapted to be employed in connection with push rods for providing an accurate and fine adjustment of said rods when the parts of the same have become worn and for locking the device against loss of adjustment after the proper seating of the valve has been determined.

Other objects and advantages will become apparent during the course of the following description.

The invention is illustrated by way of example in the accompanying drawings, in which, Figure 1 is a vertical section in elevation of a fragmentary view of parts of an internal combustion engine disclosing an embodiment of my invention applied to the push rod of the poppet valve.

Figure 2 is a view in perspective of the members associated with the push rod for adjusting said rod when the parts of the valve are worn.

Figure 3 is a horizontal section taken along the line 3—3 of Figure 1.

Referring more particularly to the drawings, 1 designates an engine cylinder and to which is integrally connected a valve cage 2 providing a bearing 4 for a valve stem 3 of a poppet valve 5. Adjacent the lower end of the valve stem is mounted an annular disc or washer 6 which is held in position by a pin 7. A spring 8 engaging the lower end of the bearing 4 and the upper face of the disc 6 maintains the valve 5 in engagement with its seat 9 in the valve cage 2.

Slidable in a bearing sleeve 10, which is mounted in a perforation in the crank case 11, is a body member 12 having an internally threaded passage 13 into which is adapted to be screwed the adjustable tappet 14.

The lower end of the body member 12 is bifurcated as shown at 15 and in which is pivotally mounted a roller 16 which is adapted to be engaged by a cam 17 mounted on a shaft 18.

The tappet is provided with external threads adapted to engage the threaded passage 13 of the body member 12 so that when said tappet is turned by the knurled portion 19, said tappet may be screwed into or out of the hollow body 12. The upper end of the tappet 14 is provided with a head 20 which is adapted to engage the enlarged portion 21 on the lower end of the stem 4. The spring 8 maintains the enlargement 21 in engagement with the head 20 at all times except when the valve and its parts are worn sufficiently to create a space between the enlargement 21 and the head 20.

The tappet is provided between the knurled portion 19 and its lower end with a peripherally toothed annular flange 22, the teeth of which are adapted to engage the upper free ends of the pins 23 which are mounted in the upper end of the hollow body member 12 and at diametrically opposite points. When wear occurs between the valve and its parts the tappet 14 is turned sufficiently to move the head 20 again into engagement with the enlargement 21. The engagement of the pins 23 with the teeth of the annular flange 22 locks the tappet in position and maintains it against rotation so that the adjustment will not be disturbed by the movement of the operating parts connected with the valve 5.

It will be noted that by providing a low pitch for the threads of the tappet 14 a very fine and accurate adjustment of the tappet relative to the enlargement 21 of the stem 4 may be had and that the pins 23 engaging the toothed flange 22 will always lock the tappet against rotary movement and maintain such adjustment.

It will further be noted that by such a construction no tools are required for the adjustments since it is only necessary to grasp the knurled portion 19 by hand and turn the same against the resistance of the spring pins 23. The resilience of said pins will cause an automatic locking of the tappet in its new position, as said pins snap into place between the next succeeding teeth in the annular member 22.

While I have shown and described the preferred embodiment of my invention, it is to be understood that various changes and modifications may be made herein without departing from the spirit of the invention or the spirit and scope of the appended claims.

What I claim is:

1. A push rod comprising a hollow internally threaded body carrying a roller at its lower end, a threaded tappet screwed within the upper end and movable in said body member, pins rigidly secured at diametrically opposite points on the upper end of the body, a peripherally toothed annular flange on the tappet engaging the free ends of the pins for maintaining the tappet against rotation, and a knurled knob on the tappet.

2. A push rod comprising a hollow body carrying a roller, a tappet mounted for movement in the upper end of said body, cooperating means on the tappet and in the hollow body for adjusting the tappet longitudinally of the hollow body, pins rigidly secured on the upper end of the body, a peripherally toothed annular flange on the tappet engaging the pins to maintain the tappet against rotation after the tappet has been adjusted longitudinally of the body member.

3. A push rod comprising a hollow body carrying a roller, a tappet mounted for movement in the upper end of said body, cooperating means on the tappet and in the hollow body, resilient pins secured on the upper end of the body, a toothed annular member on the tappet having its teeth in engagement with the free ends of the pins whereby rotation of the tappet will cause automatic locking of the tappet in its adjusted position as said pins snap into position between the next succeeding teeth on the annular member.

HENRY LEWIS HUBBARD.